E. E. NOVOTNY.
MOLDABLE COMPOSITION AND METHOD OF MAKING SAME.
APPLICATION FILED DEC. 11, 1919.

1,398,143. Patented Nov. 22, 1921.

Inventor
Emil E. Novotny
By his Attorneys
Myers, Cushman & Rea

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

MOLDABLE COMPOSITION AND METHOD OF MAKING SAME.

1,398,143.  Specification of Letters Patent.  Patented Nov. 22, 1921.

Application filed December 11, 1919. Serial No. 344,230.

*To all whom it may concern:*

Be it known that I, EMIL E. NOVOTNY, a citizen of the United States, and resident of Logan, in the county of Philadelphia and State of Pennsylvania, have invented certain new and useful Improvements in Moldable Compositions and Methods of Making Same, of which the following is a specification.

This invention relates to a composition material which is adapted to be molded, pressed or otherwise fashioned to form articles of manufacture of desired shapes.

In the present instance I have described my moldable composition as prepared in the form of sheets or boards although it may be made in other shapes such as blocks, cylinders and the like.

My invention consists in the composition material and in the method of making the same set forth in and falling within the scope of the appended claims.

Figure 1:
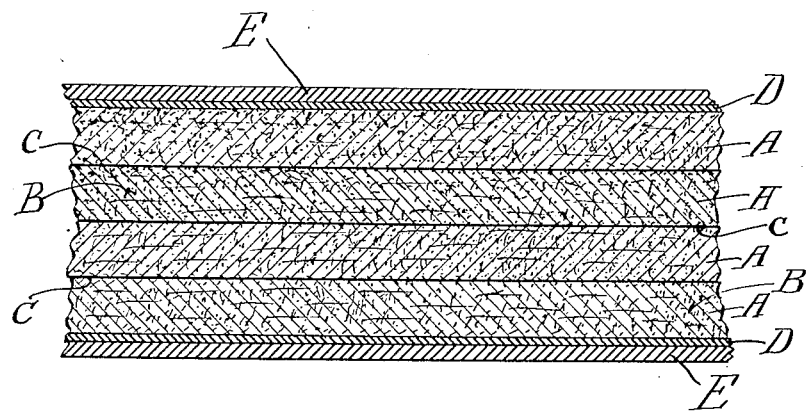
Figure 2:
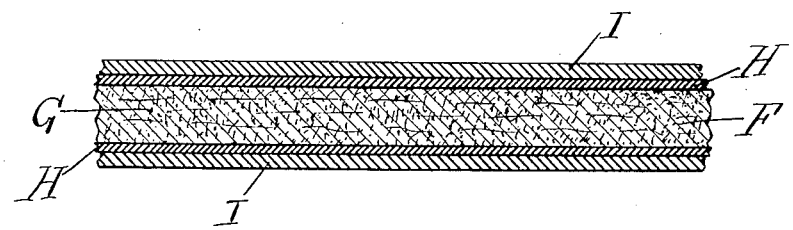

In the accompanying drawings:

Figure 1, is a cross sectional view taken through a composite sheet embodying my invention, said sheet being illustrated as laminated or composed of a plurality of plies or layers, Fig. 2, is a cross sectional view taken through a sheet composed of a single ply or layer.

In the production of my composite sheet, I proceed as follows, particular reference being made to Fig. 1 of the drawing.

I select a suitable number of layers or plies of fibrous material shown at A, and impregnate these with a liquid cementitious material as indicated at B. The fibrous plies or layers A may be of any suitable material for the purpose, preferably long fibered chip board, blotting paper, Yoshino paper, or the like. The cementitious material which I use is preferably a synthetic resin in the nature of a liquid phenolic condensation product, such as bakelite or condensite, although other cementitious substances such as shellac, asphaltum, paracumerone, casein or other organic or inorganic cements capable of hardening and setting at some stage, may be employed.

I prefer to use a phenolic condensation product, reduced to liquid form by a solvent such as alcohol, benzol or acetone, in a mixture in the proportions of approximately one part of the phenol gum to ten parts of the solvent. I impregnate the fibrous plies or layers with the liquid phenolic condensation product by soaking the plies or layers in the liquid until the latter are completely saturated. The fibrous plies or layers, while in their now soft or saturated condition are subjected to light pressure in a suitable machine to squeeze or force the excess liquid from the pores of the fiber without unduly compressing the latter. To accomplish this the plies or layers may be run through a wringer machine with the rolls of the latter so adjusted as to exert to relatively light pressure on the fiber. After this pressing or wringing operation the fibrous plies or layers, which are still in a soft and moist condition, are placed in a suitable vacuum oven and subjected to a temperature of about 140 degrees F., so that the solvents of the liquid phenolic condensation product are completely extracted and subsequently condensed. The subjection of the saturated fibrous plies or layers to the action of the vacuum oven and the resultant release of atmospheric pressure causes the evaporation of the volatile solvent, and at the same time results in the swelling or puffing of the fibers to a greater degree than when first saturated. The fibrous plies or layers in this condition may then be subjected to a drying action through any suitable agency, such as an ordinary steam-heated oven, until they are completely dried out.

At this stage it will be found that the fibrous plies or layers have incorporated therein but a minimum amount of the phenolic gum which was left when the solvents were evaporated. For example the ratio is approximately from 10 to 20 per cent. of phenolic material to 100 to 150 per cent. of fiber. In fact the plies or layers have the appearance of being composed entirely of fiber. Indeed it is my purpose to impregnate the fibrous plies or layers with but the minimum amount of phenolic gum sufficient to strengthen and sustain the fiber body under molding conditions. It is evident that if an attempt were made to mold a sheet composed entirely of fiber, the tendency would be, after the release of pressure, for the porous structure of the fiber to swell or expand or approach its original condition thereby destroying the accuracy of the molded dimensions of the article. Therefore, the use of the phenolic gum in the body of the fiber, especially when it hardens under the heat and pressure of the molding operation, will prevent expansion or swelling upon the release of the molding pressure, in addition to giving strength and support to the fibers. On the other hand should the usual practice of saturating or mixing the fiber with a relatively great quantity or percentage of the phenolic material be followed, certain distinct disadvantages would be encountered.

For instance this phenolic material possesses a high shrinkage factor and consequently the molded article would have a tendency to shrink when removed from the matrix or press. Furthermore phenolic material in its plastic condition possesses free-flowing tendencies so that under the pressure of the molding operation it will flow laterally to such an extent that it is necessary to employ side bars or confining bearers around the matrix, and even with the use of these it is difficult to produce a molded article, for example a printing plate, which will be free from rough spots, concave surfaces and depressions, caused by the side flow of the plastic material being molded. Furthermore where a relatively great quantity of plastic phenolic material is used, the molding operation will consume considerable time due to the slowness of reaction of the phenolic substances, as it will take considerable time to harden and set the same under heat and pressure. Furthermore articles made wholly or of a great percentage of phenolic material will be found to be heavy and brittle, and difficult to saw, cut or drill. In addition these phenolic condensation products are relatively expensive and articles made from the same are costly in comparison with articles made from my composition. Therefore, by treating the fibrous plies or layers with a minimum amount of phenolic condensation products, in the manner above mentioned, I eliminate the disadvantages due to attempting to mold fiber, and also inherent in molding material composed entirely or in greater part of such phenolic condensation products.

After the impregnated fibrous plies or layers have been dried, they are removed from the oven and a coating of glue or adhesive shown as C applied to one face of each ply or layer. This glue or adhesive may be of any suitable character either in the nature of a phenolic cement, or ordinary vegetable or animal cement, and may be applied through the medium of a gluing machine or in any desired manner. The fibrous plies or layers are then imposed one upon the other, until a sheet or board of the desired thickness is obtained. This sheet or board is then subjected to pressure through the medium of a weighted block or other suitable agency until the sheets are firmly united by means of the cement coatings as will be understood by reference to Fig. 1.

This multi-ply board is now ready for another important step in the operation of producing my improved molding composition. This step consists in coating both sides of the laminated sheet or board with a layer of cementitious material, preferably a phenolic condensation product which has a high percentage of filler such as lamp black, and a relatively low percentage of phenol gum. The filler and the phenol gum have of course been previously ground and mixed in a solvent to produce a free-flowing varnish. This varnish is applied by means of a brush, a coating machine or the like, preferably to both sides of the multiply or laminated sheet. It might be applied to one side only, but I prefer to apply it to both sides of the sheet in order to prevent the warping, which would be liable to occur through differences in shrinkage of the material were the coating to be applied to but one side.

This coated laminated sheet is now placed in the before-mentioned vacuum oven and subjected to a temperature of about 140 degrees F. for about ten minutes until the moisture contained in the glue or cement C and the solvent contained in the coatings D are evaporated. When such moisture and solvents have been evaporated the coated sheet is transferred to an ordinary atmospheric oven in which it is heated to a temperature of about 250 degrees F., care being taken that the heated air in the oven may circulate freely about the sheet to uniformly heat the same. The sheet is thus heated or cooked for a period of about one hour to cause the phenolic gum or material within the expanded fibrous plies to undergo the usual reaction until it assumes an almost hardened condition. In such condition the fibrous plies or layers will be dry and crisp but reinforced and strengthened by the almost completely hardened phenol gum contained therein. At the same time the coatings D will also undergo the usual reaction produced on phenolic material by heat, so that these coatings are hardened to such an extent that while still capable of being molded, yet they will at this time be impervious to all ordinary solvents. Consequently when this laminated sheet is removed from the oven and outer coatings E of softer, richer phenolic material are applied upon the coatings D, as shown in Fig. 1, the material of such coatings E cannot permeate through the coatings D, but on the contrary the coatings D will act as a barrier to the penetration of the outer coatings E. I might state that the reason I use a phenolic material having a high percentage of lamp black or other suitable filler and a low percentage of phenolic gum for the coatings D, is that when these coatings D are heated and dried in the oven, the filler holds or retains the phenol so as to prevent the latter soaking into or permeating the adjacent fibrous plies, for while the filler will not, of itself, permeate the fibrous structure, the phenolic gum in a free-flowing condition will so do unless prevented, as a free-flowing phenol is more or less in the nature of a solution.

For some purposes, as in making a rough grade of printing plate, I might use stock composed merely of the fibrous layers having the coatings D, but for fine, high-grade work there is not enough phenolic gum or material in the coating D to produce the best results and to give the sharpest and most accurate details. Consequently I prefer to apply the aforementioned outer or face coatings E upon the coatings D, these outer coatings E being composed of a richer phenolic mixture, for example about six parts of phenol gum to one part of lamp black or other filler. These outer coatings E are of course applied in the form of a varnish made by mixing the phenol and filler with a suitable solvent such as alcohol or the like, the whole mixture being thoroughly ground.

The coatings E may be also applied through any suitable instrumentality such as by means of a brush, or spraying or coating machine, and after being so applied the sheet is placed in an oven and heated at a temperature of about 212 degrees F. for an approximate period of ten minutes. This produces non-adhesive skin-like partially reacted coatings having a restricted flow but presenting considerable ductility or stretch allowing them, under pressure, to conform readily to the design of the matrix or mold. This laminated, coated sheet when removed from the oven may be kept in its original condition indefinitely as it is not affected by climatic conditions.

In Fig. 2, I have shown a single ply sheet wherein F is the fiber body, G, the impregnating phenolic material, H the inner coatings of low percentage phenolic material and I the outer or face coatings of richer phenolic material. The process of making this sheet is the same as that described for Fig. 1.

In the matter of fillers for the phenolic coatings for certain classes of work requiring high dielectric resistance or requiring different colored ornamentation, it is possible to use other suitable fillers and it is likewise possible to color these varnishes, or the smooth varnish-like coatings E can be put through a lithographic, off-set or letter press operation and various colored designs printed thereon preferably, but not necessarily, before being finally molded into shape. Fillers such as wood flour, aluminum, oxid, barium sulphate and silex are all useful for various classes of work.

I am aware of the fact that hitherto it has been proposed to make moldable sheets or stock from a composition of material such as fiber and phenolic condensation products, but in such instances reliance has been placed, for molding, upon the plasticity of the phenolic material, which has been used in relatively great percentage in the mass, with the resultant disadvantages heretofore mentioned. As contradistinguished from this I rely upon the compressibility of the mass of fiber rather than upon the plasticity of the phenolic material, the latter being employed to a minimum degree for the purpose of providing the smooth skin-like surfaces and to reinforce and maintain the fibrous material in the compressed condition which it assumes in the molding operation. In making a molded article with my composite sheet the thin phenolic skins or coatings will, of course, under the molding heat and pressure, assume their final hard and set form, and at the same time the molding pressure being transmitted to the body of fibrous material, will compress the latter to the desired shape, and in which condition of compression the fiber will be maintained both by the skin-like coatings of phenol and by the now hardened phenolic material incorporated in the fibrous structure itself.

In baking or hardening the phenolic gum incorporated in the fibrous plies or layers, as heretofore mentioned, I have an important purpose in view, and that is to strengthen the porous fiber structure to such an extent that when the sheet is used in molding an article, it will be capable of greater resistance to pressure than would be possible in the fibrous structure itself, or than would be obtained were the phenol, as incorporated in the fiber, permitted to remain in a relatively soft or somewhat plastic condition prior to the final molding of the article. My purpose will be readily understood by considering a specific example. If it is desired to mold a printing plate from a matrix composed for instance of both half-tone and type matter, my sheet may be advantageously used for the purpose because under pressure the material can be pressed or forced completely into all of the depressions of the matrix, whether deep or shallow, for, as is well known a printing plate matrix will have depressions and elevations of varying depth and height. Heretofore, for instance, where I have used a composite sheet wherein the phenolic material remained incorporated in the fibrous structure in a relatively soft or plastic condition, until the time of the final molding operation, I have found that no matter what pressure might be exerted it was practically impossible to uniformly force the material into all of the depressions of the matrix; for while it might be readily pressed into the shallow depressions it could not at the same time be forced into the deepest depressions sufficient to provide a firm, positive contact against the walls of the depressions and thereby produce accurate details. In other words the soft, sluggish, spongy nature of the plate material did not provide sufficient resistance to pressure and therefore prevented the best results in the molding operation, particularly where the matrix varied as to the depth of its depressions, for, while the material would be firmly compacted and compressed at the shallow depressions it would remain loose or uncompressed in the deeper depressions. With my material treated as heretofore mentioned, the fibrous impregnated plies or layers are substantially crisp and hard, yet, withal, tenacious and capable of being compressed, and under compression are held against breaking up or cracking by the hard phenol incorporated therein and by the tough tenacious thin phenolic skins or coatings thereon. The result is I have obtained sufficient resistance to pressure so that under the molding operation the fiber may be pressed or forced into all of the depressions of the matrix used in molding the article.

Among the pronounced advantages incident to my molding composition, especially when compared with similar composition wherein phenolic material predominates as an ingredient, I might mention the following:

In my composition, in the impregnation of the fiber, but a small amount of expensive phenolic gum is employed thus greatly reducing the ultimate cost of the material. Furthermore as the coatings of the phenolic material are prevented from penetrating the fibrous structure, such coatings may be applied in very thin films, or a few thousandths of an inch in thickness. Furthermore, my composite sheet, although capable of being molded, has in its manufacture been treated so that the phenolic substance thereof has almost reached a point of final reaction, with result that in the process of manufacture certain gases, such as ammonia, have been driven off. Therefore, when the molding operation takes place it is only the thin rich surface coatings which soften to any appreciable extent, and even these coatings have undergone chemical reaction so that they need but little heat to bring them to their final hard and infusible form. The result is that an article may be completely molded in about one-tenth of the time that would be required with such article to be made from raw phenolic material. This results in the saving of time and labor of the operator and also in the use of the molding process which is a pronounced item when we consider that in molding raw phenolic material the press must be cooled and then reheated for each molding operation. In using my material, however, the press may be kept constantly heated, for as the phenolic substance in my composition is almost in its complete reactive state, it needs but a few seconds to render it hard and infusible and in this condition may be removed directly from the hot press without undergoing any cooling action. Thus the daily capacity of the press is enormously increased, in some instances as high as twenty times the usual daily press production, as the operation of the press is practically continuous instead of intermittent.

By avoiding the necessity of cooling the material in the press, after the molding operation, I avoid the liability of ruining the casts by the material sticking or anchoring to the matrix or mold, as the casts may be removed while hot and before any shrinkage due to cooling has taken place. Furthermore, my material is only, approximately, one fourth the weight of ordinary phenolic material, which results in a considerable saving in the cost of transportation and postage, particularly on such manufactured articles as printing plates, phonographic records and other specialties. Another advantage is that the material is self contained as a molding composition in that all that is necessary is to place it upon the matrix or in the mold and proceed with the molding operation, without the necessity of powdering, dusting or varnishing the sheet for the matrix or mold as is necessary in ordinary phenolic molding operations. This results in the saving of time and expense of labor. It is not necessary to preliminarily soften the material, prior to the molding operation, and thus the use of steam tables, heating oven and the like is avoided. As there is no flow to my material except what little may occur in the thin coating E, the platens of the press and the molds will not become clogged with infusible particles caused by the overflow of phenolic material and consequently the necessity of cleaning the press after each cast is removed is obviated. This composition material may be readily cut, trimmed or shaped with ordinary implements and tools so that waste is avoided. It is practically impossible to saw, cut or trim the ordinary infusible phenolic material, as the latter is very hard and brittle and the high speed steel tools used for this operation must be constantly and frequently resharpened. The ease with which my material may be cut and trimmed renders it especially advantageous for making printing plates of various sizes to meet different conditions, and such plates may be drilled or nailed without chipping, breaking or being otherwise injured. Due to the fact that the fiber predominates in my composition, there will be little or no shrinkage during or after the molding operation, and this avoids buckling, warping and the like, which, as heretofore mentioned, frequently occurs when the articles are molded from a material wherein a phenolic substance is the predominating element.

While I have herein shown and described a preferred embodiment of my invention I wish it to be understood that I do not confine myself to all the precise details herein set forth by ilustration as modification and variation may be made without departing from the spirit of the invention or exceeding the scope of the appended claims.

What I claim is:

1. A molding composition comprising a body of compressible fibrous material having a coating of a partially reacted synthetic resin forming a relatively hard, skin-like impression-taking face, which is substantially non-shrinking under reaction and which is capable of reproducing the fine details of an impressed article.

2. A molding composition comprising a hard, crisp and compressible body formed of an expanded fiber sheet having incorporated therein and reinforced by a relatively hard synthetic resin and an impression-taking face united with the reinforced fiber sheet.

3. A molding composition comprising a body portion having two coatings, one a relatively hard, barrier coating of synthetic resin applied to the body portion, and the other a relatively soft, impression-taking, face coating of synthetic resin imposed upon the barrier coating, said barrier coating preventing the penetration of the material of the face coating to the body portion, both coatings being capable of assuming a hard, set and infusible form when heated to a predetermined degree.

4. A molding composition comprising a sheet of expanded fiber, a reinforcing body of a relatively hard, non-flowing, synthetic resin incorporated in the fiber sheet, and a relativel soft, impression-taking coating of synthetic resin united with the fiber sheet, the synthetic resin of the sheet and coating having the characteristic of assuming a hard, set and infusible form under a predetermined degree of heat, said reinforced fiber sheet being capable of compression under molding pressure.

5. A molding composition comprising a porous sheet impregnated with and reinforced by a body of a relatively hard synthetic resin, a barrier coating of a relatively hard, synthetic resin applied to the impregnated porous sheet, a second or exterior coating of relatively soft and richer synthetic resinous material applied to the barrier coating, said barrier coating preventing the penetration of the material of the exterior coating to the porous sheet.

6. A molding composition comprising a body of fibrous material impregnated with a minimum amount of a partially hardened and set phenolic condensation product, a coating of a partially reacted and dried phenolic condensation product applied to the fibrous body and a second coating of a partially hardened and set but richer phenolic condensation product applied to the first mentioned coating.

7. A molding composition comprising a fibrous body composed of a plurality of laminations impregnated with a partially hardened and set phenolic condensation product, said fibrous laminated body having exterior coatings of partially reacted phenolic condensation product.

8. A molding composition comprising a fibrous body composed of a plurality of fibrous laminations, a coating therefor comprising a dry partially hardened phenolic condensation product and a second surface coating of a softer phenolic condensation product applied to the first mentioned coating.

9. A molding composition comprising a fibrous laminated body having a plurality of coatings of phenolic condensation product, said coatings differing from each other in degree of hardness, but both coatings being partially reacted.

10. A moldable composite sheet composed of a plurality of fibrous laminations each impregnated with a relatively small amount of a partially hardened and set phenolic condensation product, each face of said sheet having a plurality of coatings of partially hardened and set phenolic condensation product, the coatings at the same side of the sheet being of relatively different hardness.

11. The herein described method of making a molding composition composed of a compressible fibrous material and a non-flowing synthetic resin product, which comprises impregnating and expanding a fiber body with a liquid synthetic resin, then heating such impregnated fiber body sufficiently to evaporate the solvent of the synthetic resin and to cause a partial reaction and partial hardening and setting of the latter, then coating the fiber body with a liquid synthetic resin, and then again heating the fiber body to evaporate the solvent of the coating and to cause a partial reaction and hardening and setting of such coating, and to cause a further reaction and hardening and setting the synthetic resin impregnating such fiber body.

Signed at New York city, in the county of New York and State of New York.

EMIL E. NOVOTNY.